United States Patent [19]

Genschow et al.

[11] Patent Number: 4,711,016
[45] Date of Patent: Dec. 8, 1987

[54] FLEXIBLE MANUFACTURING UNIT

[75] Inventors: Henning Genschow, Vienenburg; Uwe Heisel; Joachim Schuster, both of Berlin, all of Fed. Rep. of Germany

[73] Assignee: Werner and Kolb Werkzeugmaschinen GmbH, Berlin, Fed. Rep. of Germany

[21] Appl. No.: 550,083

[22] Filed: Nov. 8, 1983

[30] Foreign Application Priority Data

Nov. 19, 1982 [DE] Fed. Rep. of Germany ....... 3243335
Feb. 4, 1983 [DE] Fed. Rep. of Germany ....... 3304285

[51] Int. Cl.$^4$ ............................................ B23Q 3/156
[52] U.S. Cl. ........................................ 29/568; 29/276; 29/563; 82/2.7
[58] Field of Search ............... 29/33 P, 563, 650, 565, 29/568, 26 A, 27 C; 82/2.5, 2.7; 414/222, 223, 225, 736

[56] References Cited

U.S. PATENT DOCUMENTS

| 3,576,540 | 4/1971 | Fair | 29/568 X |
|---|---|---|---|
| 3,667,114 | 6/1972 | Smith et al. | 29/568 |
| 3,709,623 | 1/1973 | Stephan et al. | 29/568 X |
| 3,781,974 | 1/1974 | Holz et al. | 29/563 X |
| 3,909,922 | 10/1975 | Takasaki et al. | 29/563 |
| 3,952,388 | 4/1976 | Hasegawa et al. | 29/563 X |
| 4,035,904 | 7/1977 | Ishizaka et al. | 29/563 |
| 4,240,194 | 12/1980 | Inami et al. | 29/568 |
| 4,309,600 | 1/1982 | Perry et al. | 29/563 X |
| 4,359,815 | 11/1982 | Toyoda | 29/568 |
| 4,369,563 | 1/1983 | Williamson | 29/26 A X |
| 4,404,727 | 9/1983 | Zankl | 29/568 |
| 4,472,783 | 9/1984 | Johnstone et al. | 29/568 X |

FOREIGN PATENT DOCUMENTS

| 0223543 | 12/1983 | Japan | 29/568 |
|---|---|---|---|
| 2120965 | 12/1983 | United Kingdom | 82/2.7 |
| 2126136 | 3/1984 | United Kingdom | 29/568 |

Primary Examiner—Gil Weidenfeld
Assistant Examiner—Glenn L. Webb
Attorney, Agent, or Firm—Mark P. Stone; F. Eugene Davis, IV

[57] ABSTRACT

The invention relates to a flexible manufacturing unit with at least two machine tools (1,2) and a transport device (9) movable in rectangular coordinates having receptacles for carriers (8) holding workpieces and for the tools (6). The invention consists in that the transport device (9) is numerically controlled, that the tools (6) are individually transportable between a tool buffer store (29) and the machine tools (1,2) and that tool magazines (5) integrated with the machine tools are provided, which tool magazines are also accessible for tool exchange during the working period of the machine tools (1,2). In this way, a rapid method of operation is possible which is independent of the cycle and permits free selection.

17 Claims, 7 Drawing Figures

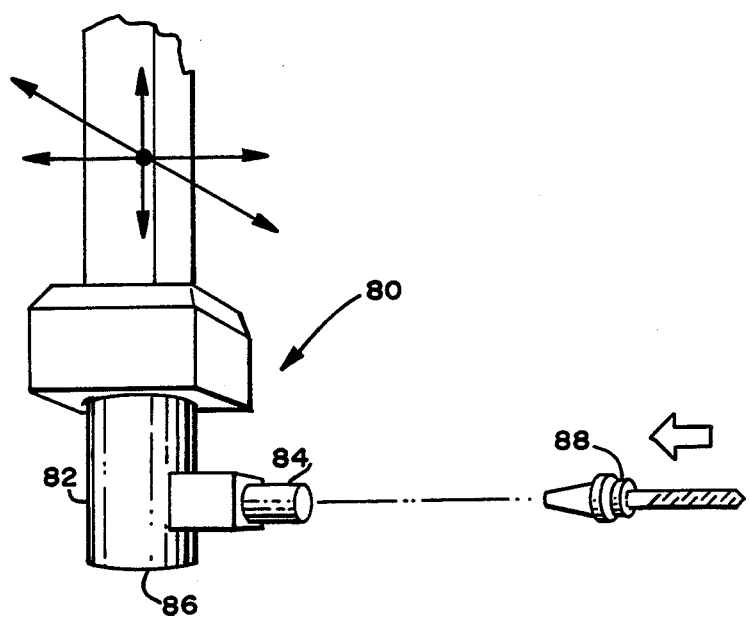
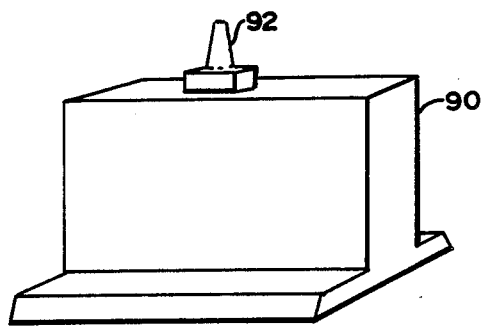
FIG. 9

4,711,016

FLEXIBLE MANUFACTURING UNIT

BACKGROUND OF THE INVENTION

The invention relates to a flexible manufacturing unit with at least two machine tools and a transport device, which can move in rectangular coordinates, with receptacles for carriers holding workpieces and for the tools.

In a known unit of this type (AT-PS 288112), no information is provided on the control of the transport device. The tools are transported in sets on pallets between a tool buffer store and the machine tools. Each machine tool has a magazine for several pallets. The tools are not accessible for exchange of tools during the working period of the machines.

SUMMARY OF THE DRAWINGS

The object of the invention is to so arrange the unit mentioned at the beginning that optimum manufacture is possible with it.

This object is attained, according to the invention, in that the transport device is numerically controlled, that the tools are individually transportable between a tool buffer store and the machine tools and that tool magazines integrated with the machine tools are provided, which tool magazines are also accessible for tool exchange during the working period of the machine tools.

Figure 1:
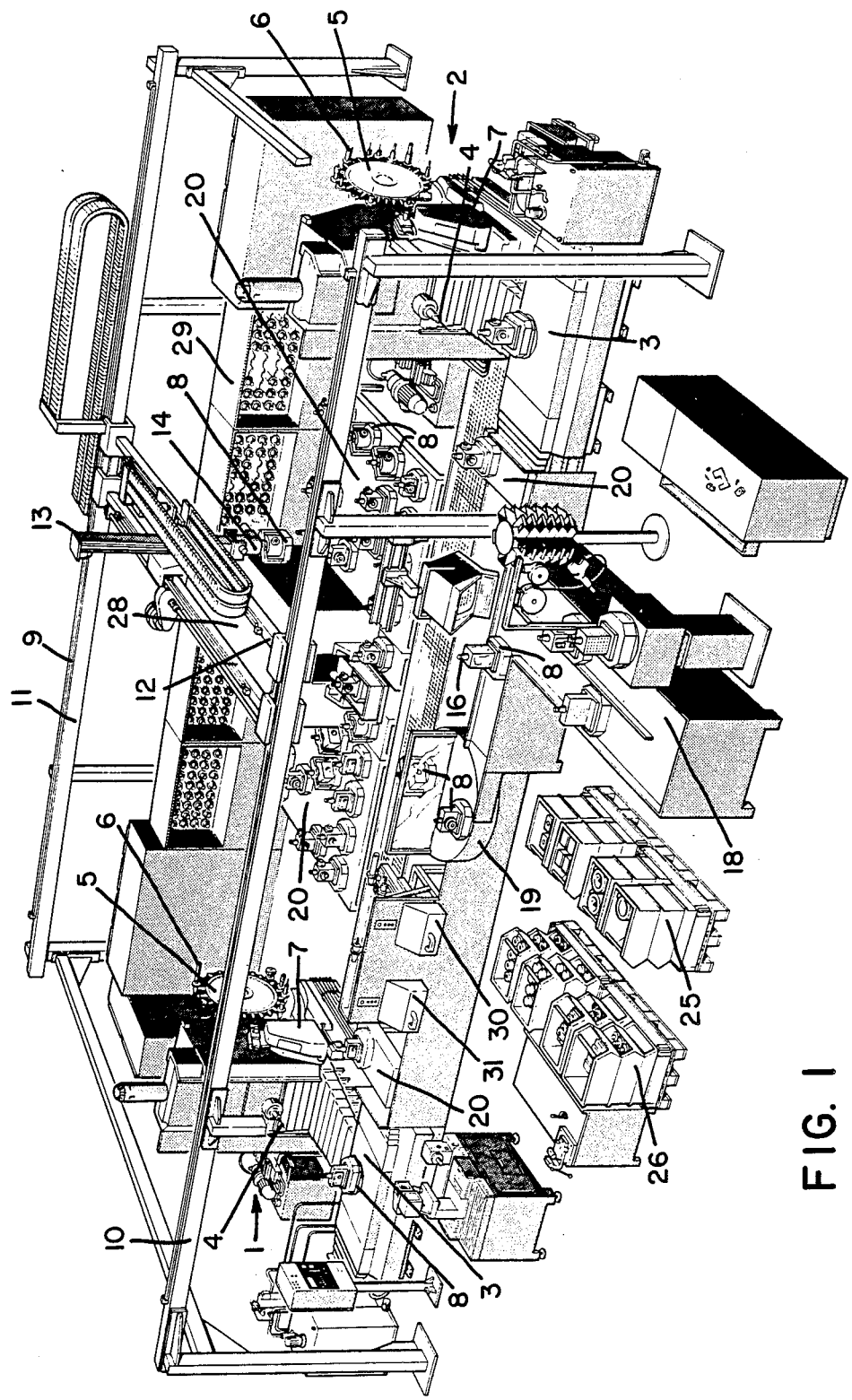
Figure 2:
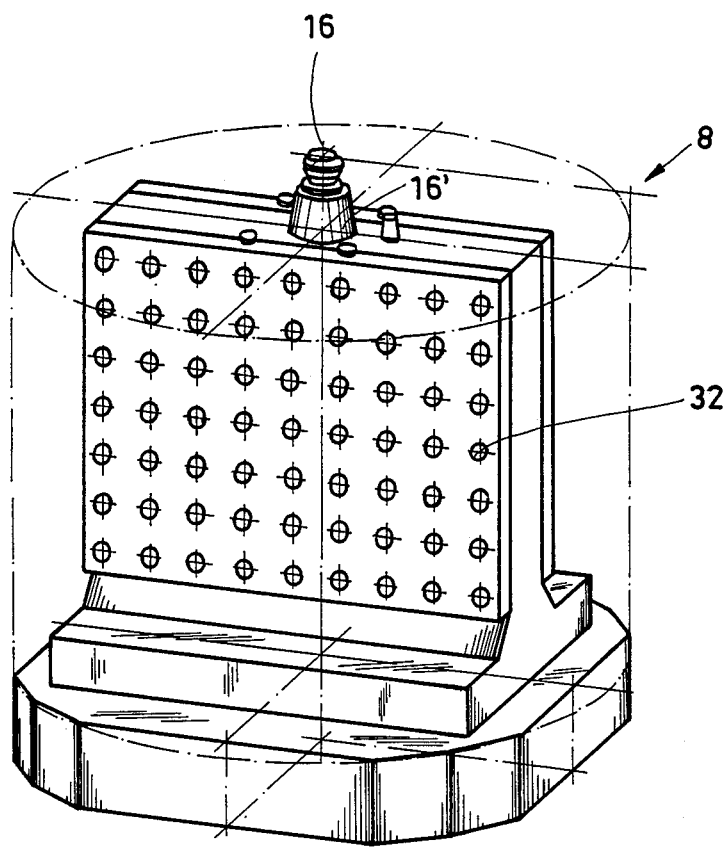
Figure 3:
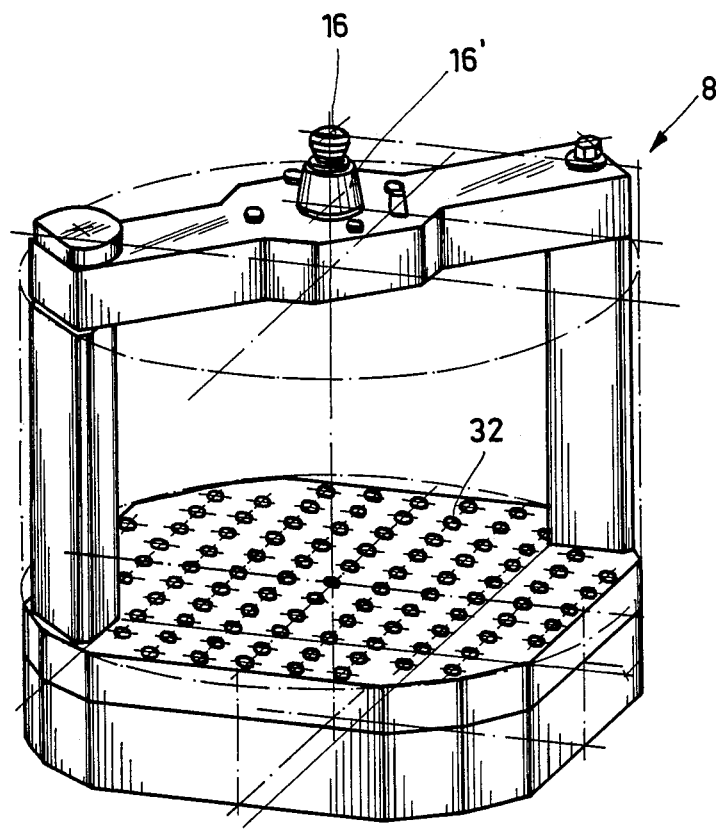
Figure 4:
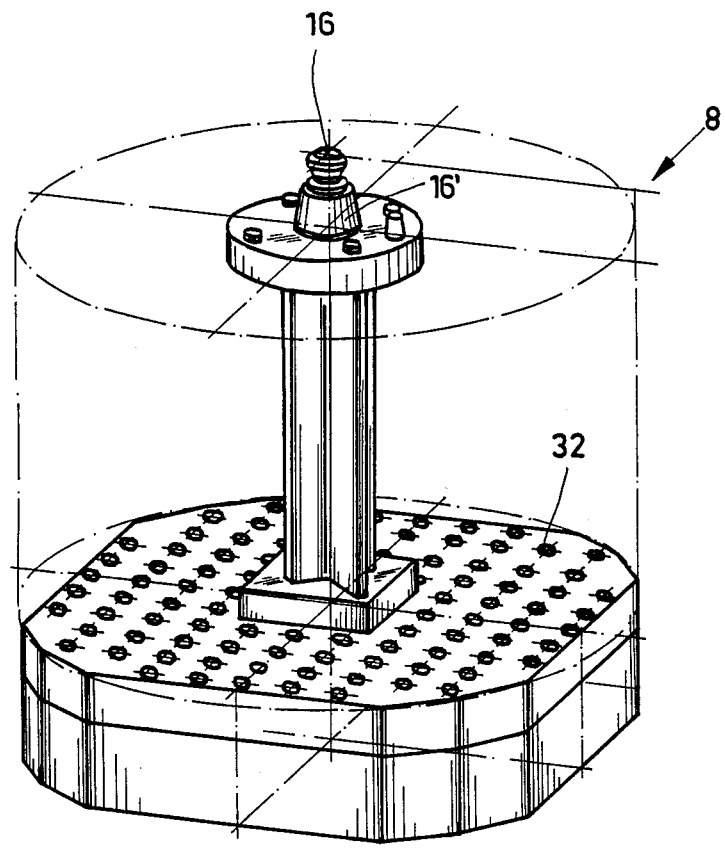
Figure 5:
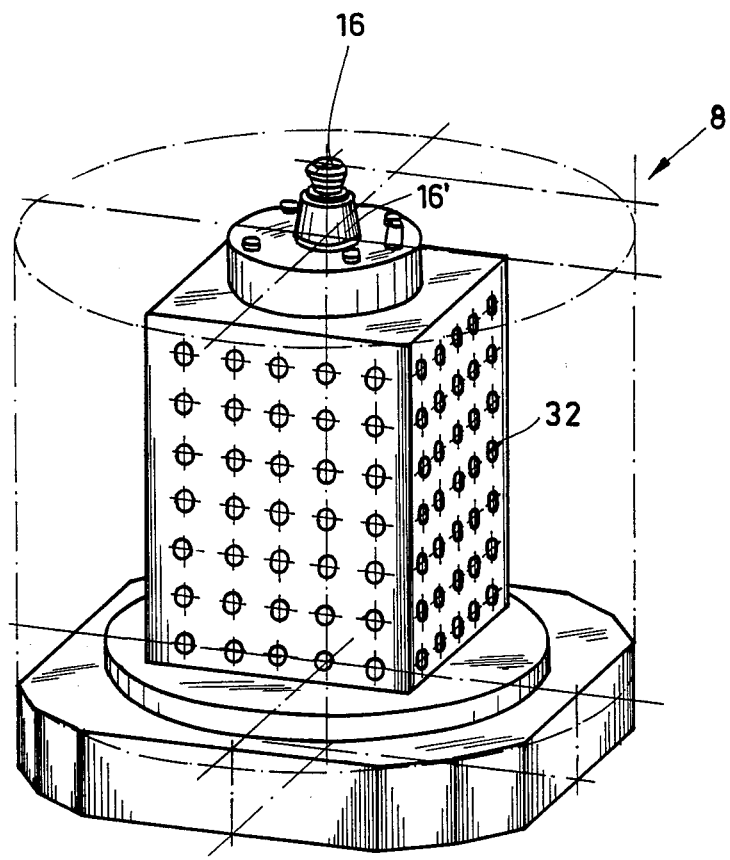

In this way, it is possible—in contrast to the known unit—to manufacture with freedom of selection and independent of the cycle. In addition, the setting-up times can be substantially reduced relative to the setting-up times necessary with the known unit.

Compared with manufacturing units with transport devices operating in polar coordinates, the advantage of a more favourable space distribution and simpler control exists.

It is particularly desirable to arrange the transport device in cross-portal construction because the space underneath the transport device is then available for other purposes.

It is, however, also desirable for the transport device to consist of a transport device in cross-portal construction located behind the machine tools or in the form of a carriage with a gripping device for the tools and of a carriage which can be moved forwards and backwards in front of the machine tools and having a gripping device for the workpiece carriers because even heavy workpiece carriers can then be transported with or without heavy workpieces.

Favourable space distributions then occur if two similar or similar types of machine tools are placed beside one another and the input/output stations, supply stations and buffer stores are located between them and/or to the side of them.

BRIEF DESCRIPTION OF THE DRAWINGS

Figure 6:
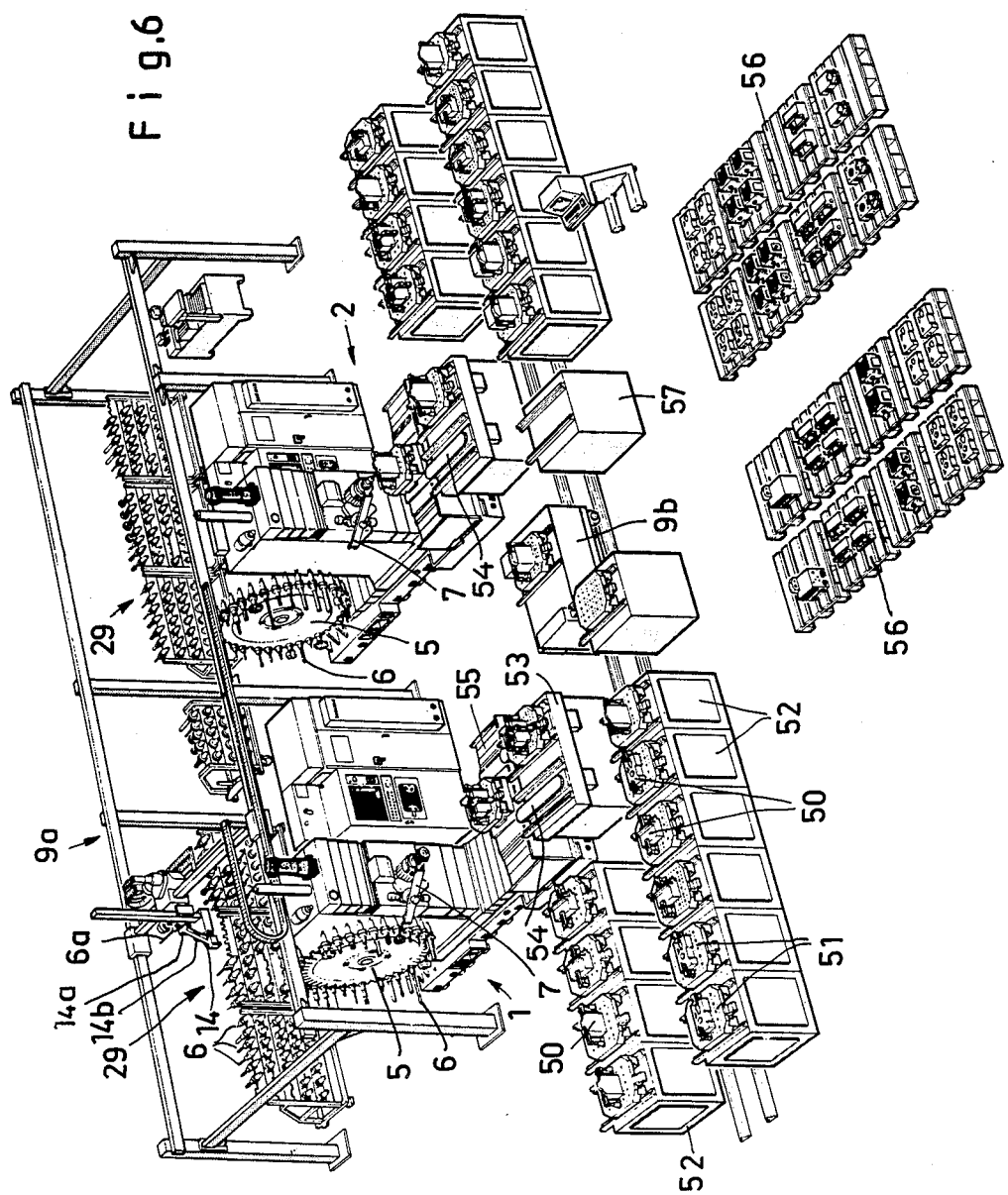
Figure 7:
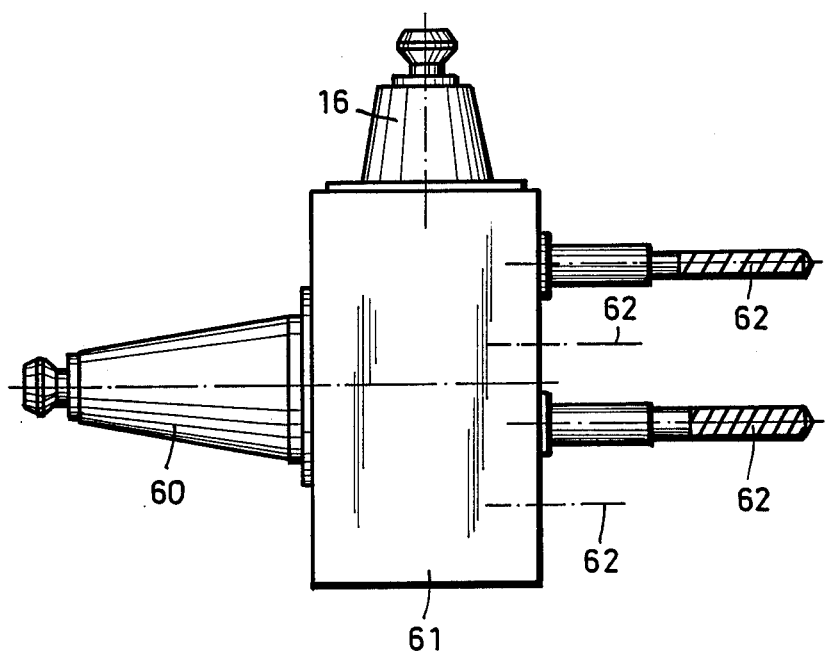

Further details of the invention are given in the drawing. In this:

FIG. 1 shows a perspective representation of a first embodiment of the manufacturing unit according to the invention;

FIGS. 2-5 show perspective representations of workpiece carriers suitable for it;

FIG. 6 shows a perspective representation of a second embodiment of the manufacturing unit according to the invention and FIG. 7 shows a tool carrier.

DESCRIPTION OF THE PREFERRED EMBODIMENT

In FIG. 1, two machine tools arranged as machining centers are generally indicated by 1 and 2. Each machine tool includes a table 3, a working spindle 4, a tool magazine 5 with tools 6 and a tool changer 7. A transport device generally indicated by 9 serves to provide the tables 3 of the machine tools 1 and 2 with workpiece carriers 8 carrying workpieces and to provide the tool magazine 5 with tools 6. This transport device is arranged in cross-portal construction. It has two longitudinal beams 10 and 11 and a transverse beam 12 supported on these so as to be movable. A column-shaped holder 13 for a gripper 14 is supported so that it can be vertically moved on the transverse beam 12. The gripper 14 can grasp the adaptors 16 located on the tools 6 and the workpiece carriers 8. Similar adaptors can also be applied to measuring and auxiliary tools which can be transported by the gripper 14.

Preferably, the gripping device has two receptacles, one for gripping the adaptors of a workpiece carrier and one for gripping the adaptors of the tools. In the preferred embodiment of the invention, the receptacle for gripping the workpiece carrier opens towards the bottom of the gripping device while the receptacle for gripping the tool opens towards the side of the gripping device. Accordingly, a single gripping device may be used for both the tools and carriers. Additionally, the gripping device may include a plurality of receptacles to receive the adaptors of a plurality of tools.

The carriers 8 are provided on their lower surfaces with ball rollers which permit easy movement in all direction. At a mounting area 18, they are provided with fixing and fastening arrangements, not shown, for accepting workpieces, and then passed on to an input and output station 19 where they receive workpieces. From here, they pass to workpiece carrier buffer stores 20.

Containers 25 serve to store unmachined workpieces and containers 26 to store the finished parts.

A wash station 28 and buffer stores 29 for tools 6 and measurement and auxiliary tools are provided on the side of the manufacturing unit opposite to the input and output station 19. A tool output is indicated by 30 and a tool input by 31.

Details of the workpiece carriers 8 are provided by FIGS. 2-5. They are provided with grids of securing holes 32 by means of which the workpieces are fastened to the workpiece carriers. In addition, they have similar adaptors 16 by means of which they can be grasped by the gripper 14 of the transport device. The adaptors posses a conical area 16', which facilitates the grasping of the adaptor 16 by the gripper and its subsequent centring.

FIG. 6 shows another embodiment of a unit according to the invention. In this, the machining centers 1 and 2 are nearer together compared with the embodiment of FIG. 1. The transport device is divided into two transport devices, namely into one in cross-portal construction 9a for the tools 6 and into one in the form of a carriage 9b for the workpieces 50, which carriage can be moved in front of the centers 1, 2, the workpieces 50 being firmly fixed to workpiece carriers 51. Buffer stores 52 for the workpiece carriers 51 equipped with workpieces 50 are located along the path of the carriage 9b. A device for changing the workpiece carriers 51 holding workpieces is indicated by 53. This device 53 is equipped with two drag chains 54 (of which only one is visible). There is a similar drag chain on the carriage 9b. A machine table is indicated by 55, wooden pallets for depositing the blank workpieces and the finished workpieces by 56 and a mounting area by 57.

The workpieces 50 are dealt with as follows. The workpieces are first firmly fastened to the workpiece carriers 51 on the mounting area 57. The workpiece carriers 51 holding workpieces are then collected by the carriage 9b which draws them onto itself by means of its drag chain. The workpiece carriers 51 holding workpieces are then transported by the carriage to a buffer store 52 and pushed onto the buffer store 52 by means of the drag chain located on the carriage 9b. The carriage 9b collects a workpiece carrier holding a workpiece from a buffer store 52 and transports it in front of the changing device 53. The latter takes the workpiece carrier 51 holding a workpiece and pushes it onto the machine table 55. The workpiece 50 is now machined. In a similar manner, the machined workpiece can be transported in the reverse direction, during which procedure, however, it does not usually pass through a buffer store 52 but arrives directly on the mounting area 57 and from there onto a pallet 56. The carriage 9b only places the workpiece initially on a buffer store 52 if the mounting area 57 should on occasion be occupied. The transport of the workpieces from the mounting area 57 onto the pallets 56 and visa versa occurs by means of a crane, which is not shown.

As in FIG. 1, the tool magazine is indicated by 5, the tool changer by 7, a tool buffer store by 29 and a gripper by 14 in FIG. 6. The gripper 14 has an arm 14a, which can be pivoted about an axis 14b. A tool 6a grasped by it out of the tool buffer store 29 can, in this way, be pivoted into a position in which it is parallel to the tools located in the magazine 5 so that it can be inserted into the latter.

As best seen in FIG. 6, the tools 6 stored in the tool buffer store 29 are arranged adjacent to each other in several horizontally oriented rows elevated above each other.

FIG. 7 shows a tool carrier. This consists of a rotatable adaptor 60 (which can be inserted in a working receptacle of a machine tool), of a support body 61, in which is located a branch drive and/or spindle bearings, tools 62 and a further adaptor 16, which can be grasped by the gripper 14 of the unit in accordance with FIG. 1 and is firmly attached to the support body 61.

The possible tool carriers are: multi-spindle heads, boring and facing heads, boring heads, boring bridges, angle heads, special boring heads or special milling and special boring heads.

We claim:

1. Flexible manufacturing unit with at least two machine tools, a tool buffer store assigned to all machine tools, tool magazines, of which each is assigned to one machine tool adjoining it, and a single transport device for transporting tools and carriers, said transport device being movable in rectangular coordinates for individually transporting tools between the tool buffer store and the tool magazines and for the transport of work pieces fastened on the carriers, said unit being adapted to manufacture with random selection of tools and workpieces, said single transport device being developed in cross-portal construction and having a single gripping device for the tools and the carriers.

2. Manufacturing unit as claimed in claim 1, wherein two similar or similar type machine tools (1,2) are placed beside one another, and input/output stations, supply stations and buffer stores are located between said machine tools.

3. Manufacturing unit as claimed in claim 1, wherein said workpiece carriers (8) and said tools (6) each include adaptors for gripping the carriers (8) and the tools (6), said adaptors for said workpieces and said tools being similar to one another or of a similar type.

4. Manufacturing unit as claimed in claim 1, wherein the single gripping device (14) has a receptacle open towards the bottom for receiving adaptors provided on the workpiece carriers (8) and a receptacle open towards the side for receiving adaptors provided on the tools (6).

5. Manufacturing unit as claimed in claim 1, wherein the workpiece carriers (8) are provided with ball rollers on their lower surfaces.

6. Manufacturing unit as claimed in claim 1, wherein the single gripping device (14) defines several receptacles for receiving adaptors provided on the tools (6).

7. Manufacturing unit as claimed in claim 1, wherein the single gripping device (14) is movable about one axis or about two mutually perpendicular axes.

8. Manufacturing unit as claimed in claim 1, including a tool carrier (60,61) having a first adaptor (60) which can be inserted in the working receptacle of a machine tool (1,2) and a second adaptor (16) to be received in the single gripping device (14) of the transport device (9).

9. Manufacturing unit as claimed in claim 8, wherein the second adaptor (16) can be grasped by a receptacle of the single gripping device (14) open towards the bottom.

10. Manufacturing unit as claimed in claim 8 wherein said tool carrier includes a supporting body and the second adaptor (16) is located on said supporting body.

11. Manufacturing unit as claimed in claim 1, wherein the tool magazines (5) are circular carriers which carry the tools (6) at their peripheries, said machine tools (1,2) having working spindles, and means for rotating said circular carriers such that the rotational axes of the circular carriers (5) are horizontal and normal to the rotational axes of the working spindles of the machine tools (1,2).

12. Manufacturing unit as claimed in claim 1 wherein said first transport device (9a) is in cross-portal construction and includes a gripping device (14) having an arm (14a) which can be pivoted about an axis (14b) which is directed at an angle of 45° to an axis of rotation of the magazines (5) and to the position of the tools (6) in the buffer store, said gripping device having a gripper for the tools (6) located on the arm.

13. Manufacturing unit as claimed in claim 1 wherein the first transport device is arranged in cross-portal construction.

14. Manufacturing unit as claimed in claim 1 including a grippind device (14) for the tools (6), said tools including adaptors, said gripping device including several receptacles for receiving said adaptors on said tools.

15. Manufacturing unit as claimed in claim 1 including a tool carrier (60,61) having a first adaptor (60) which can be inserted in the working receptacle of a machine tool (1,2) and a further adaptor (16), said manufacturing unit including a gripping device for gripping said further adaptor.

16. Manufacturing unit as claimed in claim 1 wherein the tool magazines (5) are circular carriers which carry the tools (6) at their peripheries, said machine tools having working spindles, and means for rotating said circular carriers such that the rotational axes of the circular carriers (5) are horizontal and normal to the rotational axes of the working spindles of the machine tools (1,2).

17. Manufacturing unit as claimed in claim 1 wherein two similar or similar type machine tools (1,2) are placed beside one and other, and input/output stations, supply stations and buffer stores are located between said machine tools and at the side of said machine tools between them.

* * * * *

UNITED STATES PATENT AND TRADEMARK OFFICE
CERTIFICATE OF CORRECTION

PATENT NO. : 4,711,016
DATED : Dec. 8, 1987
INVENTOR(S) : Genschow, Heisel, Schuster It is certified that error appears in the above-identified patent and that said Letters Patent is hereby corrected as shown below:

Col. 1, line 67: Delete "and" and substitute --;--.

Col. 1, line 68: After "carrier", delete "." and insert --;--.

Figure 8:
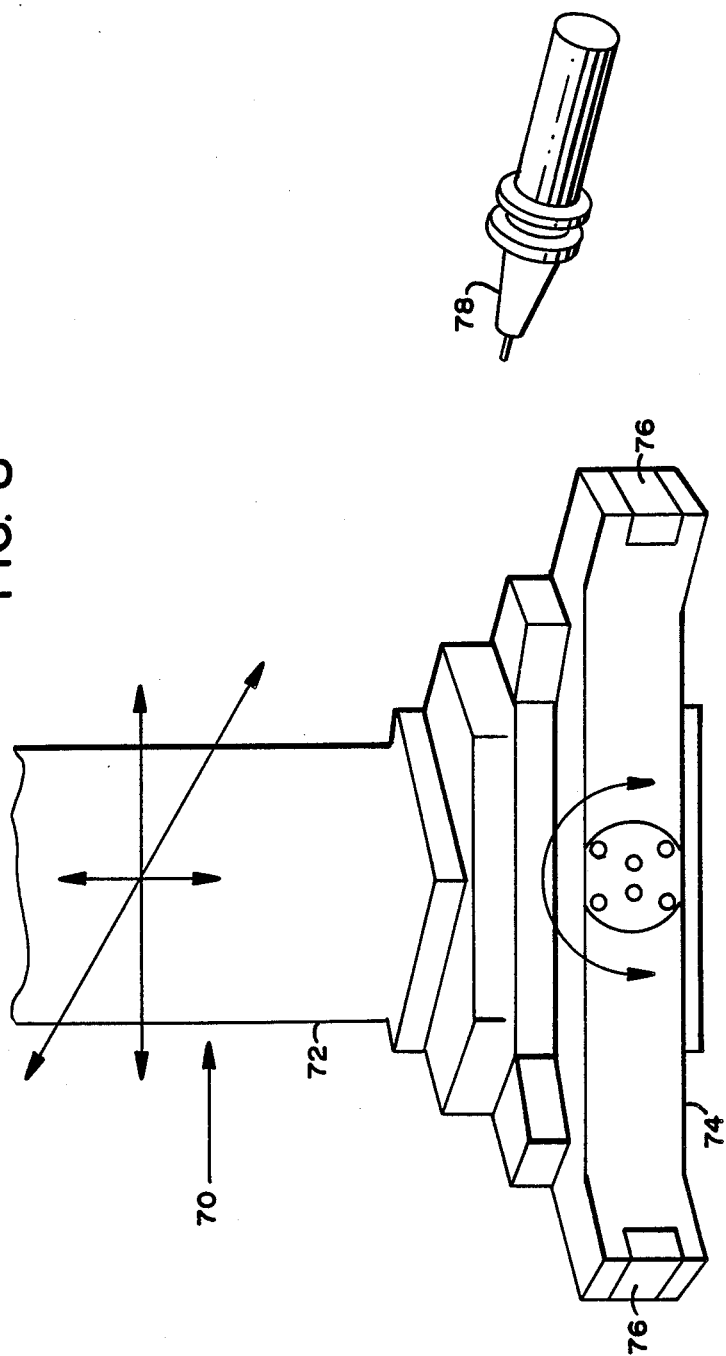

Col. 1, below line 68: Insert the following:

--FIG. 8 of the drawings illustrates a gripper for a plurality of tools in accordance with the present invention; and FIG. 9 illustrates a gripper for holding both a tool and a carrier in accordance with the present invention.--

UNITED STATES PATENT AND TRADEMARK OFFICE
CERTIFICATE OF CORRECTION

PATENT NO. : 4,711,016

DATED : Dec. 8, 1987

INVENTOR(S) : Genschow, Heisel, Schuster

It is certified that error appears in the above-identified patent and that said Letters Patent is hereby corrected as shown below:

Col. 3, below line 52:  Add the following:

--FIG. 8 of the drawings illustrates a gripper device designated by reference numeral 70 capable of holding and transporting more than a single tool 78.  The gripping device includes a supporting shaft 72 suspended from an elevated guide beam (not shown in FIG. 8) and a head 74 mounted to the downward end of the supporting shaft.  The head portion 74 defines a plurality of outwardly extending receptacles 76 for receiving and transporting a plurality of tools 78, such as tools ordinarily stored in a tool magazine.

UNITED STATES PATENT AND TRADEMARK OFFICE
CERTIFICATE OF CORRECTION

PATENT NO. : 4,711,016
DATED : Dec. 8, 1987
INVENTOR(S) : Genschow, Heisel, Schuster It is certified that error appears in the above-identified patent and that said Letters Patent is hereby corrected as shown below:

FIG. 9 of the drawings illustrates a gripping device for simultaneously holding and transporting a tool and a carrier. The gripping device is generally illustrated by the reference numeral 80 and includes a head portion 82 having a receptacle portion 84 extending horizontally, outwardly therefrom. The head portion 82 further includes a receptacle 86 defined on the bottom thereof and facing downwardly. The receptacle 84 is intended to receive and transport a tool 88, while the receptacle 86 is intended to receive and transport a carrier 90 having an adapter 92 which is insertably received within the receptacle 86.--

Signed and Sealed this

Twenty-fourth Day of May, 1988

Attest:

DONALD J. QUIGG

Attesting Officer

Commissioner of Patents and Trademarks